A. FISCHER.
Liquid Cooler.

No. 54,708.  Patented May 15, 1866.

Witnesses:

Inventor:
Adelbert Fischer
Per Munn & Co
Attorneys

UNITED STATES PATENT OFFICE.

ADALBERT FISCHER, OF NEW YORK, N. Y.

IMPROVED LIQUID-COOLER.

Specification forming part of Letters Patent No. 54,708, dated May 15, 1866.

*To all whom it may concern:*

Be it known that I, ADALBERT FISCHER, of the city, county, and State of New York, have invented a new and useful Improvement in Liquid-Coolers; and I do hereby declare that the following is a full, clear, and exact description thereof, which will enable others skilled in the art to make and use the same, reference being had to the accompanying plate of drawings, forming part of this specification, in which—

Figure 1:
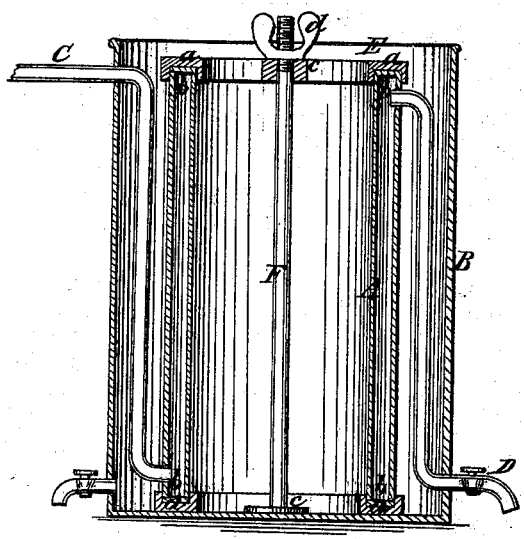
Figure 2:
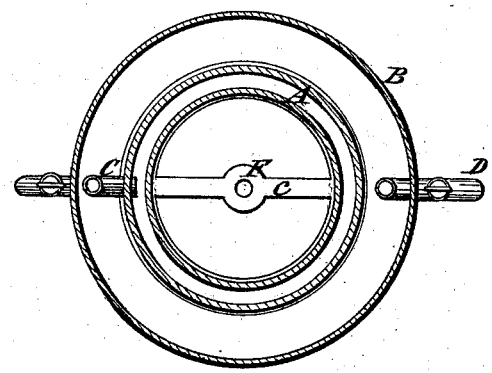

Figure 1 represents a vertical central section of this invention. Fig. 2 is a horizontal section of the same.

Similar letters of reference indicate like parts.

This invention relates to an improvement in that class of liquid-coolers on which a patent has been granted to me March 20, 1866, and which are composed of one or more annular cylinders which are in contact on the inside and outside by the cooling-liquid, and through which the liquid to be cooled is made to pass.

My present improvement consists in providing said annular cylinder with movable heads, which are held in position by a central bolt, the joint being rendered tight by suitable packing in such a manner that by unscrewing the center bolt the heads are released and access can be had to the interior of the annular cylinder or cylinders for the purpose of cleaning.

A represents an annular cylinder which is situated in a vessel, B, the diameter and height of which are larger than those of the annular cylinder, so that water, ice, or other cooling medium can be brought in contact with the inner and outer surfaces of the annular cylinder.

A supply-pipe, C, serves to conduct the liquid to be cooled into the annular cylinder near its bottom, and said liquid, after having passed through the cylinder, escapes through the discharge-pipe D.

The heads E of the annular cylinder are held in their places by the central bolt, F. Said heads are made with annular recesses $a$, capable of receiving suitable packing-pieces $b$, and if the heads are applied to the cylinder the rims or edges of the annular recesses catch over the ends of the cylinder, as clearly shown in Fig. 1.

The bolt passes through cross-bars $c$ in the heads, and by screwing up the nut $d$ both heads are drawn up tight. By unscrewing said nut the heads are released and easy access can be had to the interior of the cylinder A for the purpose of cleaning.

The heads E are cast, and they are made cheap and durable, and by the use of suitable packing the joints between said heads and the ends of the cylinder are rendered tight without difficulty.

What I claim as new, and desire to secure by Letters Patent, is—

The moveable heads E, with annular recesses $a$, in combination with the center bolt, F, annular cylinder A, and vessel B, all constructed and operating substantially as and for the purpose described.

The above specification of my invention signed by me this 22d day of March, 1866.

ADALBERT FISCHER.

Witnesses:
WM. F. MCNAMARA,
ALEX. F. ROBERTS.